United States Patent Office 3,558,613
Patented Jan. 26, 1971

3,558,613
SUBSTITUTED PARATOLYLOXYACETIC ACIDS
Stephen J. Kuhn and Janet E. Ilavsky, Sarnia, Ontario, Canada, assignors to The Dow Chemical Company, Midland, Mich., a corporation of Delaware
No Drawing. Filed May 22, 1968, Ser. No. 731,295
Int. Cl. C07c 65/02; C07d 85/42
U.S. Cl. 260—240                     2 Claims

ABSTRACT OF THE DISCLOSURE

Disclosed are substituted p-tolyloxyacetic acids wherein the substituent is attached to the p-methyl group of the tolyl moiety and represents 1-oxo-2-indanylidene and 2-phenyl - 5 - oxo-2-oxazolin-4-ylidene. These compounds are useful as pesticides.

---

The present invention relates to novel and useful substituted p-tolyloxyacetic acids, and more particularly, those in which the substituent is attached to the p-methyl group of the tolyl moiety through a carbon-carbon double bond. These substituents include 1-oxo-2-indanylidene which is representable as follows:

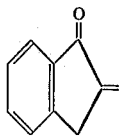

and 2-phenyl-5-oxo-2-oxazolin-4-ylidene which is representable as follows:

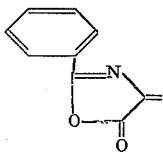

The two substituted p-tolyloxyacetic acid compounds of the present invention can thus respectively be represented by Formulas I and II:

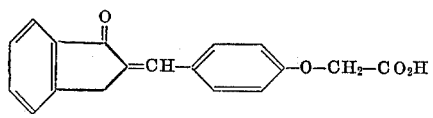

(I)

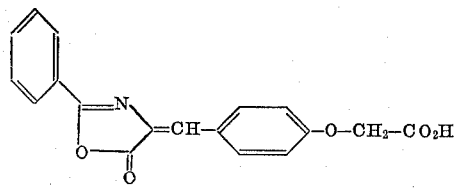

(II)

The compounds of the present invention are crystalline solids and are somewhat soluble in organic solvents but relatively insoluble in water. They are useful as pesticides for the control of a wide variety of pests such as the various plant attacking fungal organisms and insect pests such as flies and roaches, and parasite pests such as ascarids or other intestinal parasites.

The compounds of the present invention are respectively prepared by reacting and condensing together 4-formylphenoxyacetic acid of the Formula III:

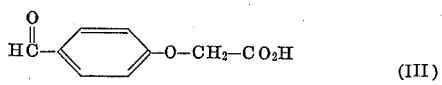

(III)

and (a) 1-indanone or (b) hippuric acid (otherwise referred to as benzamidoacetic acid or N-benzylglycine).

The reaction of 4-formylacetic acid and 1-indanone is conducted in the presence of an alkali metal hydroxide as catalyst, such as sodium hydroxide, potassium hydroxide, and lithium hydroxide, and conveniently in a liquid reaction medium such as can be provided by any of a wide variety of organic solvents or mixtures thereof, for example, alkanols (ethanol, methanol), amides (dimethylformamide), water, and other polar, inert solvents. The amounts of the reactants to be employed are not critical, some of the product being formed when employing any proportions. The reaction consumes the reactants, however, in the ratio of one mole of the 4-formylphenoxyacetic acid per mole of 1-indanone and the employment of such proportions is preferred.

Since the alkali metal hydroxide reacts with the 4-formylphenoxyacetic acid reactant, it is critical that a small amount in excess of alkali metal hydroxide be employed per mole of formylphenoxyacetic acid in order to provide a catalytic amount of catalyst. Preferably, the alkali metal hydroxide is employed in amounts of 10 mole percent excess or more, and preferably up to about a 50 mol percent excess. A large excess does not interfere with the reaction but is undesirable from the standpoint of economy.

In carrying out this reaction, the formyl phenoxyacetic acid, 1-indanone, alkali metal hydroxide, and solvent, if employed, are contacted and maintained together in any convenient fashion. In one manner, the alkali metal hydroxide is added to a solution of the formylphenoxyacetic acid and 1-indanone. The reaction is allowed to proceed at room temperature or with slight heating up to about 100° C., preferably from about 20° to 50° C. and with stirring. After a period of time sufficient to produce the desired product has elapsed, the reaction mixture is neutralized with a dilute acid solution and thereafter conventionally treated to isolate the product. Such conventional procedures include filtration, recrystallization, and the like.

The reaction of 4-formlacetic acid and hippuric acid is conducted in the presence of loweralkyl anhydride and alkali metal loweralkanoate as catalyst. Suitable loweralkyl anhydrides are those containing from 4 to 8 carbon atoms such as acetic anhydride, propionic anhydride, and butyric anhydride. Suitable alkali metal loweralkanoates are those which contain from 1 to 4 carbon atoms and include sodium acetate, sodium propionate, potassium butyrate, lithium acetate, and the like. The reaction is conducted in a liquid reaction medium preferably provided by the employed loweralkyl anhydride reactant. Other organic solvents can be additionally employed, for example, alkanols (ethanol, methanol) amides (dimethylformamide), water, and other polar, inert solvents. The amounts of the reactants to be employed are not critical, some of the product being formed when employing any proportions. The reaction consumes the reactants, however, in the ratio of one mole of the 4-formylphenoxyacetic acid per mole of hippuric acid per mole each of loweralkyl anhydride and alkali metal loweralkanoate and the employment of such proportions is preferred. Since each of the loweralkyl anhydride and alkali metal loweralkanoate participate in the reaction, it is critical that at least one mole or a small amount in excess of each of these reactants be employed per mole of formylphenoxyacetic acid and hippuric acid in order to insure complete reaction. Generally, the alkali metal loweralkanoate is employed in amounts of 10 mole percent excess or more, and preferably up to about a 50 mole percent excess. Large excesses do not interfere with the reaction but are undesirable from the standpoint of economy. The loweralkyl anhydride can advantageously be employed in amounts upwards of a fivefold or more molar excess without deleterious effects.

In carrying out this reaction, the formylphenoxyacetic acid, hippuric acid, loweralkyl anhydride, alkali metal loweralkanoate, and solvent, if employed, are contacted and maintained together in any convenient fashion. In one manner, the alkali metal loweralkanoate is added to a solution of the formylphenoxyacetic acid and 1-indanone in the loweralkyl anhydride. The reaction is allowed to proceed at temperatures of from about 20° C. to about 150° C., preferably, from about 80° to 120° C. and with stirring. After a period of time sufficient to produce the desired product has elapsed, the reaction mixture is conveniently filtered and the solid collected and further purified, if desired, via conventional procedures as recrystallization.

The following examples serve further to illustrate the invention and the manner by which it can be practiced but, as such, should not be construed as limitations upon the overall scope hereof.

EXAMPLE 1 p-Formylphenoxyacetic acid (9.0 grams; 0.05 mole) and 1-indanone (6.6 grams; 0.05 mole) are dispersed in 100 milliliters of ethanol with stirring at room temperature. While vigorous stirring is continued at room temperature, 30 milliliters of a 10 percent aqueous sodium hydroxide (0.075 mole of sodium hydroxide) are added to the reaction mixture and the stirring is continued for an additional 15 minutes following the addition. The reaction mixture is then acidified with dilute hydrochloric acid which initiates precipitation. The precipitated yellow crystals are separated on a sintered glass filter and washed with four 50 milliliter portions of warm water and one 50 milliliter portion of methanol. The crystals are allowed to dry and are then recrystallized from boiling dimethylformamide (153° C.) to obtain the desired ($\alpha$-(1-oxo-2-indanylidene)-p-tolyloxy)acetic acid product as pale yellow flaky crystals having a melting point of 204° C.

Elemental analysis.—Calculated for $C_{18}H_{14}O_4$ (percent): C, 73.5; H, 4.8. Found (percent): C, 73.4; H, 4.9.

EXAMPLE 2

Nine grams (0.05 mole) of p-formylphenoxyacetic acid and 6.6 grams (0.05 mole) of 1-indanone are dispersed in and mixed with 50 milliliters of ethanol at room temperature. While stirring the resultant solution, 42 milliliters of a 10 percent aqueous potassium hydroxide solution (0.075 mole potassium hydroxide) are added to the mixture. After stirring the resultant mixture for 15 minutes following the addition, the reaction mixture solidifies. To the solid mass are added 50 milliliters of water and the mixture stirred for 2 minutes to obtain a homogeneous suspension. The suspension is acidified with a 10 percent hydrochloric acid solution which precipitates a solid. The solid is filtered and washed with water. The washed precipitate is dried and recrystallized from dimethylformamide to obtain the desired ($\alpha$-(1-oxo-2-indanylidene)p-tolyloxy)acetic acid product.

EXAMPLE 3 p-Formylphenoxyacetic acid (18.0 grams; 0.1 mole) are dispersed in 30 grams (0.32 mole) of acetic anhydride at room temperature and with stirring. To the resultant solution are successively added 8.2 grams (0.1 mole) of sodium acetate followed by 17.5 grams (0.1 mole) of hippuric acid, each portion-wise while stirring is continued. The mixture is thereafter heated on a hot plate to a temperature of from 110° C. to 120° C. until the mixture becomes homogeneous. A few minutes following this period, the reaction mixture solidifies and it is then heated on a steam bath for 2 hours. After this time, 50 milliliters of warm ethanol are added and the resultant mixture is allowed to cool to room tempearture. It is then filtered and the collected solid washed three times each with 50 milliliter portions of hot water and then with 10 milliliters of cold ethanol. The washed solid is dried and recrystallized from boiling dimethylformamide to obtain the desired ($\alpha$-(2-phenyl-5-oxo-2-oxazolin-4-ylidene)p-tolyloxy)acetic acid product as yellow crystals having a melting point of 237° C. (with decomposition).

Elemental analysis.—Calculated for $C_{18}H_{13}NO_5$ (percent): C, 66.9; H, 4.05; N, 4.33. Found (percent): C, 66.8; H, 4.08; N, 4.28.

EXAMPLE 4 p-Formylphenoxyacetic acid (18.0 grams; 0.1 mole), hippuric acid (17.5 grams; 0.1 mole) 80 grams of butyric anhydride and 13 grams (0.1 mole) of potassium propionate are reacted together according to the procedure set forth in Example 3, the butyric anhydride in lieu of acetic anhydride and the potassium propionate in lieu of sodium acetate, to obtain the ($\alpha$-(2-phenyl - 5 - oxo-2-oxazolin-4-ylidene)p-tolyloxy)-acetic acid product.

The compounds of the present invention are useful as pesticides for the control of a wide variety of fungal, insect, and parasite pests, such as the causative agents of apple scab and tomato late blight, Bacillus subtilis, and beetles and roaches, and worms, ascarids, tricostrongyloids, hookworms, pinworms, screwworms and cattle grubs. For such use, the unmodified compounds can be employed. Alternatively, the compounds can be dispersed in an edible solid to prepare animal feed compositions or on an inert finely divided solid to prepare dust compositions. The latter dust compositions can be dispersed in water with or without the aid of a wetting agent, the resulting aqueous dispersion employed as sprays. In other procedures, the compounds can be employed as a constituent in edible oils or in other oils or solvents or as a constituent in solvent-in-water or water-in-solvent emulsions or dispersions which can be employed as sprays, drenches or washes. Good results are obtained when employing compositions containing pesticidal concentrations and usually from about 50 to 10,000 parts per million by weight of one or more of the compounds.

In representative operations, aqueous compositions containing 500 parts per million by weight of one of ($\alpha$-(1 - oxo - 2 - indanylidene)-p-tolyloxy)acetic acid and ($\alpha$-(2 - phenyl - 5 - oxo-2-oxazolin-4-ylidene)-p-tolyloxy) acetic acid gives substantially 100 percent controls and kills of American cockroaches.

In further operations, ($\alpha$-(1-oxo-2-indanylidene)-p-tolyloxy) acetic acid gives a substantially complete control and kill of the organism Bacillus subtilis when it is applied to agar supports to a concentration of 500 parts per million by weight containing thriving colonies of such organism.

The starting compound, 4-formylphenoxyacetic acid, is a known compound and can be prepared in accordance with known procedures. In one manner, the sodium salt of p-hydroxybenzaldehyde is formed and reacted with sodium 2-chloroacetic with slight heating. The reaction mixture is treated with a sodium bicarbonate solution and thereafter, the product 4-formylphenoxyacetic acid is precipitated by the addition of hydrochloric acid to the reaction mixture. It can then be recovered by filtration. 1-indanone and hippuric acid are likewise known compounds and can be prepared in accordance with known methods.

What is claimed is:
1. (α - (1-oxo-2-indanylidene)-p-tolyloxy)acetic acid.
2. (α-(2 - phenyl-5-oxo-2-oxazolin-4 - ylidene)-p-tolyloxy)acetic acid.

References Cited

UNITED STATES PATENTS 3,363,003   1/1968   Bolhofer _____ 260—520X

FOREIGN PATENTS 1,104,335   10/1961   Germany _____ 260—240

JOHN D. RANDOLPH, Primary Examiner

U.S. Cl. X.R.

424—272, 314; 260—520